United States Patent
Yamago et al.

(10) Patent No.: US 7,615,601 B2
(45) Date of Patent: Nov. 10, 2009

(54) PROCESS FOR PRODUCTION OF LIVING RADICAL POLYMERS AND POLYMERS

(75) Inventors: Shigeru Yamago, Kyoto (JP); Junichi Yoshida, Hirakata (JP)

(73) Assignee: Otsuka Chemical Co., Ltd., Osaka (JP)

( * ) Notice: Subject to any disclaimer, the term of this patent is extended or adjusted under 35 U.S.C. 154(b) by 230 days.

(21) Appl. No.: 11/898,034

(22) Filed: Sep. 7, 2007

(65) Prior Publication Data
US 2008/0009597 A1 Jan. 10, 2008

Related U.S. Application Data

(62) Division of application No. 10/523,611, filed as application No. PCT/JP03/10116 on Aug. 8, 2003, now Pat. No. 7,291,690.

(30) Foreign Application Priority Data
Aug. 8, 2002 (JP) ............................. 2002-231917

(51) Int. Cl.
*C08F 4/44* (2006.01)
(52) U.S. Cl. .................. 526/323; 526/194; 526/319; 528/403; 528/408
(58) Field of Classification Search ................ 526/323, 526/194, 319; 528/403, 408
See application file for complete search history.

(56) References Cited

U.S. PATENT DOCUMENTS 4,124,633 A 11/1978 Leonard et al.

OTHER PUBLICATIONS

Yamago et al. "Organotellurium Compound as Novel Initiators for Controlled/Living radical Polymerizations. Synthesis of Functionalized Polystyrenes and End-Group Modifications", Journal of the American Chemical Society, 124 (12), 2874-2875, Feb. 27, 2002.*

Shigeru Yamago et al., "Tailored Synthesis of Structurally Defined Polymers by Organotellurim-Mediated Living Radical Polymerization (TERP): Synthesis of Poly(meth)acrylate Derivatives and Their Di- and Triblock Copolymers", Journal of the American Chemical Society, vol. 124, No. 46, pp. 13666 to 13667, Nov. 20, 2002.

Shigeru Yamago et al., "Organotellurium Compounds as Novel Initiators for Controlled/Living Radical Polymerizations, Synthesis of Functionalized Polystyrenes and End-Group Modifications", Journal of the American Chemical Society, vol. 124, No. 12, pp. 2874 to 2875, Mar. 27, 2002.

Goto et al., "Mechanism-Based Invention of High-Speed Living Radical Polymerization Using Organotellurium Compounds and Azo-Initiators", Journal of American Chemical Society, 2003, 125, 8720-8721.

* cited by examiner

*Primary Examiner*—David Wu
*Assistant Examiner*—Michael M Bernshteyn
(74) *Attorney, Agent, or Firm*—Wenderoth, Lind & Ponack, L.L.P.

(57) ABSTRACT

A process for producing a living radical polymer characterized in that a vinyl monomer is polymerized with use of a living radical polymerization initiator represented by the formula (1) and a compound represented by the formula (2), and the living radical polymer obtained by the process

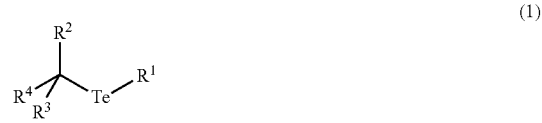
(1)

wherein $R^1$ is $C_1$-$C_8$ alkyl, aryl, substituted aryl or an aromatic heterocyclic group, $R^2$ and $R^3$ are each a hydrogen atom or $C_1$-$C_8$ alkyl, and $R^4$ is aryl, substituted aryl, an aromatic heterocyclic group, acyl, oxycarbonyl or cyano $$(R^1Te)_2 \quad (2)$$

wherein $R^1$ is the same as above.

6 Claims, No Drawings

PROCESS FOR PRODUCTION OF LIVING RADICAL POLYMERS AND POLYMERS

CROSS REFERENCE

The present application is a divisional application of Ser. No. 10/523,611, filed Feb. 7, 2005 now U.S. Pat. No. 7,291,690, which is a 371 application of PCT/JP2003/010116, filed Aug. 8, 2003.

TECHNICAL FIELD

The present invention relates to a process for producing living radical polymers and the living radical polymers obtained by the process.

BACKGROUND ART

Living radical polymerization is a polymerization process which is adapted for precision control of molecular structures while ensuring convenience and universal usefulness of radical polymerization, and is powerful means for preparing novel polymer materials. Georges et al has made a report on a typical example of living radical polymerization using TEMPO (2,2,6,6-tetramethyl-1-piperidinyloxy) as an initiator (publication of JP-A No. 1994-199916).

This process makes it possible to control molecular weights and molecular weight distributions, but requires a high polymerization temperature of 130° C. and is difficult to use for monomers having a thermally unstable functional group. The process is also unsuited to the control of modification of terminal functional groups of high molecular weight compounds.

An object of the present invention is to provide a process for producing a living radical polymer by polymerizing a vinyl monomer with use of an organotellurium compound represented by the formula (1) and a compound represented by the formula (2), the process making possible precision control of molecular weights and molecular weight distributions (PD=Mw/Mn) under mild conditions, and the polymer.

DISCLOSURE OF THE INVENTION

The present invention provides a process for producing a living radical polymer characterized in that a vinyl monomer is polymerized with use of a living radical polymerization initiator represented by the formula (1) and a compound represented by the formula (2), and the living radical polymer obtained by the process

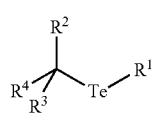

(1)

wherein $R^1$ is $C_1$-$C_8$ alkyl, aryl, substituted aryl or an aromatic heterocyclic group, $R^2$ and $R^3$ are each a hydrogen atom or $C_1$-$C_8$ alkyl, and $R^4$ is aryl, substituted aryl, an aromatic heterocyclic group, acyl, oxycarbonyl or cyano $$(R^1Te)_2 \quad (2)$$

wherein $R^1$ is the same as above.

The living radical polymer of the present invention is produced by polymerizing a vinyl monomer in the presence of a compound represented by the formula (2) using a living radical polymerization initiator represented by the formula (1)

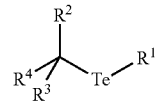

(1)

wherein $R^1$ is $C_1$-$C_8$ alkyl, aryl, substituted aryl or an aromatic heterocyclic group, $R^2$ and $R^3$ are each a hydrogen atom or $C_1$-$C_8$ alkyl, and $R^4$ is aryl, substituted aryl, an aromatic heterocyclic group, acyl, oxycarbonyl or cyano $$(R^1Te)_2 \quad (2)$$

wherein $R^1$ is the same as above.

The living radical polymerization initiator to be used in the present invention is a compound represented by the formula (1).

Examples of groups represented by $R^1$ are as follows.

Examples of $C_1$-$C_8$ alkyl groups usable are straight-chain, branched chain or cyclic alkyl groups having 1 to 8 carbon atoms, such as methyl, ethyl, n-propyl, isopropyl, cyclopropyl, n-butyl, sec-butyl, tert-butyl, cyclobutyl, n-pentyl, n-hexyl, n-heptyl and n-octyl. Preferable alkyl groups are straight-chain or branched chain alkyl groups having 1 to 4 carbon atoms. Methyl or ethyl is more preferable.

Examples of groups usable include aryl groups such as phenyl and naphthyl, substituted aryl groups such as phenyl having a substituent and naphthyl having a substituent, and aromatic heterocyclic groups such as pyridyl, furyl and thienyl. Examples of substituents of aryl groups having a substituent are a halogen atom, hydroxyl, alkoxyl, amino, nitro, cyano, carbonyl-containing groups represented by —$COR^5$ ($R^5$=$C_1$-$C_8$ alkyl, aryl, $C_1$-$C_8$ alkoxyl or aryloxy), sulfonyl, trifluoromethyl, etc. Preferable aryl groups are phenyl and trifluoromethyl-substituted phenyl. Preferably such substituted groups have one or two substituents at the para-position or ortho-position.

Examples of groups represented by $R^2$ and $R^3$ are as follows.

Examples of $C_1$-$C_8$ alkyl groups usable are the same as the alkyl groups represented by $R^1$ and given above.

Examples of groups represented by $R^4$ are as follows.

Examples of aryl, substituted aryl, aromatic heterocyclic groups usable are the same as those groups represented by $R^1$ and given above.

Examples of acyl groups usable are formyl, acetyl, benzoyl, etc.

Examples of preferred oxycarbonyl groups are those represented by —$COOR^6$ ($R^6$=H, $C_1$-$C_8$ alkyl or aryl) such as carboxyl, methoxycarbonyl, ethoxycarbonyl, propoxycarbonyl, n-butoxycarbonyl, sec-butoxycarbonyl, tert-butoxycarbonyl, n-pentoxycarbonyl and phenoxycabonyl. Methoxycarbonyl and ethoxycarbonyl are more desirable oxycarbonyl groups.

Examples of preferred groups represented by $R^4$ are aryl, substituted aryl and oxycarbonyl. The aryl group is preferably phenyl. Examples of preferred substituted aryl groups are phenyl substituted with a halogen atom and phenyl substituted with trifluoromethyl. When the substituent is a halogen, the phenyl is substituted with preferably one to five halogen atoms. In the case of alkoxyl or trifluoromethyl, preferably one or two substituents are present. When having one substituent, the group is substituted preferably at the para- or ortho-position. When the group has two substituents, the meta-positions are preferred. Examples of preferred oxycarbonyl groups are methoxycarbonyl and ethoxycarbonyl.

Examples of preferred organotellurium compounds represented by the formula (1) are compounds wherein $R^1$ is $C_1$-$C_4$ alkyl, $R^2$ and $R^3$ are each a hydrogen atom or $C_1$-$C_4$ alkyl, and $R^4$ is aryl, substituted aryl or oxycarbonyl. More preferable organotellurium compounds are those wherein $R^1$ is $C_1$-$C_4$ alkyl, $R^2$ and $R^3$ are each a hydrogen atom or $C_1$-$C_4$ alkyl, and $R^4$ is phenyl, substituted phenyl, methoxycarbonyl or ethoxycarbonyl.

Examples of organotellurium compounds represented by the formula (1) are as follows.

Such organotellurium compounds are preferably (methyltellanyl-methyl)benzene, (1-methyltellanyl-ethyl)benzene, (2-methyltellanyl-propyl)benzene, 1-chloro-4-(methyltellanyl-methyl)benzene, 1-hydroxy-4-(methyltellanyl-methyl)benzene, 1-methoxy-4-(methyltellanyl-methyl)benzene, 1-amino-4-(methyltellanyl-methyl)benzene, 1-nitro-4-(methyltellanyl-methyl)benzene, 1-cyano-4-(methyltellanyl-methyl)benzene, 1-methylcarbonyl-4-(methyltellanyl-methyl)benzene, 1-phenylcarbonyl-4-(methyltellanyl-methyl)benzene, 1-methoxycarbonyl-4-(methyltellanyl-methyl)benzene, 1-phenoxycarbonyl-4-(methyltellanyl-methyl)benzene, 1-sulfonyl-4-(methyltellanyl-methyl)benzene, 1-trifluoromethyl-4-(methyltellanyl-methyl)benzene, 1-chloro-4-(1-methyltellanyl-ethyl)benzene, 1-hydroxy-4-(1-methyltellanyl-ethyl)benzene, 1-methoxy-4-(1-methyltellanyl-ethyl)benzene, 1-amino-4-(1-methyltellanyl-ethyl)benzene, 1-nitro-4-(1-methyltellanyl-ethyl)benzene, 1-cyano-4-(1-methyltellanyl-ethyl)benzene, 1-methylcarbonyl-4-(1-methyltellanyl-ethyl)benzene, 1-phenylcarbonyl-4-(1-methyltellanyl-ethyl)benzene, 1-methoxycarbonyl-4-(1-methyltellanyl-ethyl)benzene, 1-phenoxycarbonyl-4-(1-methyltellanyl-ethyl)benzene, 1-sulfonyl-4-(1-methyltellanyl-ethyl)benzene, 1-trifluoromethyl-4-(1-methyltellanyl-ethyl)benzene [1-(1-methyltellanyl-ethyl)-4-trifluoromethylbenzene], 1-(1-methyltellanyl-ethyl)-3,5-bis-trifluoromethylbenzene, 1,2,3,4,5-pentafluoro-6-(1-methyltellanyl-ethyl)benzene, 1-chloro-4-(2-methyltellanyl-ethyl)benzene, 1-hydroxy-4-(2-methyltellanyl-propyl)benzene, 1-methoxy-4-(2-methyltellanyl-propyl)benzene, 1-amino-4-(2-methyltellanyl-propyl)benzene, 1-nitro-4-(2-methyltellanyl-propyl)benzene, 1-cyano-4-(2-methyltellanyl-propyl)benzene, 1-methylcarbonyl-4-(2-methyltellanyl-propyl)benzene, 1-phenylcarbonyl-4-(2-methyltellanyl-propyl)benzene, 1-methoxycarbonyl-4-(2-methyltellanyl-propyl)benzene, 1-phenoxycarbonyl-4-(2-methyltellanyl-propyl)benzene, 1-sulfonyl-4-(2-methyltellanyl-propyl)benzene, 1-trifluoromethyl-4-(2-methyltellanyl-propyl)benzene, 2-(methyltellanyl-methyl)pyridine, 2-(1-methyltellanyl-ethyl)pyridine, 2-(2-methyltellanyl-propyl)pyridine, 2-methyl-2-methyltellanyl-propanal, 3-methyl-3-methyltellanyl-2-butanone, methyl 2-methyltellanyl-ethanate, methyl 2-methyltellanyl-propionate, methyl 2-methyltellanyl-2-methylpropionate, ethyl 2-methyltellanyl-ethanate, ethyl 2-methyltellanyl-propionate, ethyl 2-methyltellanyl-2-methylpropionate [ethyl-2-methyl-2-methyltellanyl-propionate], ethyl 2-(n-butyltellanyl)-2-methylpropionate [ethyl-2-methyl-2-n-butyltellanyl-propionate], 2-methyltellanylacetonitrile, 2-methyltellanyl-propionitrile, 2-methyl-2-methyltellanyl-propionitrile, (phenyltellanyl-methyl)benzene, (1-phenyltellanyl-ethyl)benzene, (2-phenyltellanyl-propyl)benzene, etc. The above compounds also include all compounds having ethyltellanyl, 1-ethyllellanyl, 2-ethyltellanyl, butyltellanyl, 1-butyltellanyl or 2-butyltellanyl, as changed from the portion of methyltellanyl, 1-methyltellanyl or 2-methyltellanyl. Preferable are (methyltellanyl-methyl)benzene, (1-methyltellanyl-ethyl)benzene, (2-methyltellanyl-propyl)benzene, 1-chloro-4-(1-methyltellanyl-ethyl)benzene, 1-trifluoromethyl-4-(1-methyltellanyl-ethyl)benzene [1-(1-methyltellanyl-ethyl)-4-trifluoromethylbenzene], methyl 2-methyltellanyl-2-methylpropionate, ethyl 2-methyltellanyl-2-methylpropionate [ethyl-2-methyl-2-methyltellanyl-propionate], ethyl 2-(n-butyltellanyl)-2-methylpropionate [ethyl-2-methyl-2-n-butyltellanyl-propionate], 1-(1-methyltellanyl-ethyl)-3,5-bis-trifluoromethylbenzene, 1,2,3,4,5-pentafluoro-6-(1-methyltellanyl-ethyl)benzene, 2-methyltellanyl-propionitrile, 2-methyl-2-methyltellanylpropionitrile, (ethyltellanyl-methyl)benzene, (1-ethyltellanyl-ethyl)benzene, (2-ethyltellanyl-propyl)benzene, methyl 2-ethyltellanyl-2-methylpropionate, ethyl 2-ethyltellanyl-2-methylpropionate, 2-ethyltellanyl-propionitrile, 2-methyl-2-ethyltellanylpropionitrile, (n-butyltellanyl-methyl)benzene, (1-n-butyltellanyl-ethyl)benzene, (2-n-butyltellanyl-propyl)benzene, methyl 2-n-butyltellanyl-2-methylpropionate, ethyl 2-n-butyltellanyl-2-methylpropionate, 2-n-butyltellanyl-propionitrile, 2-methyl-2-n-butyltellanyl-propionitrile.

The living radical polymerization initiator represented by the formula (1) can be prepared by reacting a compound of the formula (3), a compound of the formula (4) and metallic tellurium.

Examples of compounds represented by the formula (3) are as follows.

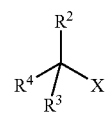

(3)

wherein $R^2$, $R^3$ and $R^4$ are as defined above, and X is a halogen atom.

Examples of groups represented by $R^2$, $R^3$ and $R^4$ are as given above.

Examples of groups represented by X can be a halogen atom such as fluorine, chlorine, bromine or iodine. Chlorine and bromine are preferable.

Examples of compounds usable are benzyl chloride, benzyl bromide, 1-chloro-1-phenylethane, 1-bromo-1-phenylethane, 2-chloro-2-phenylpropane, 2-bromo-2-phenylpropane, p-chlorobenzyl chloride, p-hydroxybenzyl chloride, p-methoxybenzyl chloride, p-aminobenzyl chloride, p-nitrobenzyl chloride, p-cyanobenzyl chloride, p-methylcarbonylbenzyl chloride, phenylcarbonylbenzyl chloride, p-methoxycarbonylbenzyl chloride, p-phenoxycarbonylbenzyl chloride, p-sulfonylbenzyl chloride, p-trifluoromethylbenzyl chloride, 1-chloro-1-(p-chlorophenyl)ethane, 1-bromo-1-(p-chlorophenyl)ethane, 1-chloro-1-(p-hydroxyphenyl)ethane, 1-bromo-1-(p-hydroxyphenyl)-ethane, 1-chloro-1-(p-methoxyphenyl)ethane, 1-bromo-1-(p-methoxyphenyl)ethane, 1-chloro-1-(p-aminophenyl)ethane, 1-bromo-1-(p-aminophenyl)ethane, 1-chloro-1-(p-nitrophenyl)ethane, 1-bromo-1-(p-nitrophenyl)ethane, 1-chloro-1-(p-cyanophenyl)ethane, 1-bromo-1-(p-cyanophenyl)ethane, 1-chloro-1-(p-methylcarbonylphenyl)ethane, 1-bromo-1-(p-methylcarbonylphenyl)ethane, 1-chloro-1-(p-phenylcarbonylphenyl)ethane, 1-bromo-1-(p-phenylcarbonylphenyl)-ethane, 1-chloro-1-(p-methoxycarbonylphenyl)ethane, 1-bromo-1-(p-methoxycarbonylphenyl)ethane, 1-chloro-1-(p-phenoxycarbonylphenyl)-ethane, 1-bromo-1-(p-phenoxycarbonylphenyl)ethane, 1-chloro-1-(p-sulfonylphenyl)ethane, 1-bromo-1-(p-sulfonylphenyl)ethane, 1-chloro-1-(p-trifluoromethylphenyl)ethane, 1-bromo-1-(p-trifluoromethylphenyl)ethane, 2-chloro-2-(p-chlorophenyl)propane, 2-bromo-2-(p-chlorophenyl)propane, 2-chloro-2-(p-hydroxyphenyl)-propane, 2-bromo-2-(p-hydroxyphenyl)propane, 2-chloro-2-(p-methoxyphenyl)propane, 2-bromo-2-(p-methoxyphenyl)propane, 2-chloro-2-(p-aminophenyl)propane, 2-bromo-2-(p-aminophenyl)propane, 2-chloro-2-(p-nitrophenyl)propane, 2-bromo-2-(p-nitrophenyl)-propane, 2-chloro-2-(p-cyanophenyl)propane, 2-bromo-2-(p-cyanophenyl)propane, 2-chloro-2-(p-methylcarbonylphenyl)propane, 2-bromo-2-(p-methylcarbonylphenyl)propane, 2-chloro-2-(p-phenylcarbonylphenyl)propane, 2-bromo-2-(p-phenylcarbonylphenyl)-propane, 2-chloro-2-(p-methoxycarbonylphenyl)propane, 2-bromo-2-(p-methoxycarbonylphenyl)propane, 2-chloro-1-(p-phenoxycarbonylphenyl)propane, 2-bromo-2-(p-phenoxycarbonylphenyl)propane, 2-chloro-2-(p-sulfonylphenyl)propane, 2-bromo-2-(p-sulfonylphenyl)propane, 2-chloro-2-(p-trifluoromethylphenyl)propane, 2-bromo-2-(p-trifluoromethylphenyl)propane, 2-(chloromethyl)pyridine, 2-(bromomethyl)pyridine, 2-(1-chloroethyl)pyridine, 2-(1-bromoethyl)pyridine, 2-(2-chloropropyl)pyridine, 2-(2-bromopropyl)pyridine, methyl 2-chloroethanoate, methyl 2-bromoethanoate, methyl 2-chloropropionate, methyl 2-bromoethanoate, methyl 2-chloro-2-methylpropionate, methyl 2-bromo-2-methylpropionate, ethyl 2-chloroethanoate, ethyl 2-bromoethanoate, ethyl 2-chloropropionate, ethyl 2-bromoethanoate, ethyl 2-chloro-2-ethylpropionate, ethyl 2-bromo-2-ethylpropionate, 2-chloroacetonitrile, 2-bromoacetonitrile, 2-chloropropionitrile, 2-bromopropionitrile, 2-chloro-2-methylpropionitrile, 2-bromo-2-methylpropionitrile, (1-bromoethyl)benzene, ethyl-2-bromo-isobutylate, 1-(1-bromoethyl)-4-chlorobenzene, 1-(1-bromoethyl)-4-trifluoromethylbenzene, 1-(1-bromoethyl)-3,5-bis-trifluoromethylbenzene, 1,2,3,4,5-pentafluoro-6-(1-bromoethyl)benzene, 1-(1-bromoethyl)-4-methoxybenzene, ethyl-2-bromo-isobutylate, etc.

Examples of compounds represented by the formula (4) are as follows.

$$M(R^1)m \qquad (4)$$

wherein $R^1$ is as defined above, M is an alkali metal, alkaline earth metal or copper atom, and m is 1 when M is an alkali metal, m is 2 when M is an alkaline earth metal, or m is 1 or 2 when M is a copper atom.

Examples of groups represented by $R^1$ are as given above.

Examples of metals represented by M are lithium, sodium, potassium and like alkali metals, magnesium, calcium and like alkaline earth metals, and copper. Lithium is desirable.

In case that M is magnesium, the compound (4) may either be $Mg(R^1)_2$ or a compound represented by MgX (X is a halogen atom) which is a Grignard reagent. Chlorine and bromine are preferable.

Examples of compounds usable are methyllithium, ethyllithium, n-butyllithium, phenyllithium, p-methoxyphenyllithium, etc. Methyllithium, ethyllithium, n-butyllithium and phenyllithium are preferable.

Next, a detailed description will be given of the process for preparing the compound.

Metallic tellurium is suspended in a solvent. Examples of solvents usable are dimethylformamide (DMF), tetrahydrofuran (THF) and like polar solvents, toluene, xylene and like aromatic solvents, hexane and like aliphatic hydrocarbons, dialkyl ethers and like ethers, etc. THF is preferable. The amount of solvent to be used, which is suitably adjusted, is 1 to 100 ml, preferably 5 to 10 ml, per gram of metallic tellurium.

A compound (4) is slowly added dropwise to the suspension, followed by stirring. The reaction time differs with the reaction temperature and pressure and is usually 5 minutes to 24 hours, preferably 10 minutes to 2 hours. The reaction temperature is −20° C. to 80° C., preferably 15° C. to 40° C., more preferably room temperature. The reaction is conducted usually under atmospheric pressure, but may be conducted at increased pressure or in a vacuum.

Next, a compound (3) is added to the reaction mixture, followed by stirring. The reaction time differs with the reaction temperature and pressure and is usually 5 minutes to 24 hours, preferably 10 minutes to 2 hours. The reaction temperature is −20° C. to 80° C., preferably 15° C. to 40° C., more preferably room temperature. The reaction is conducted usually under atmospheric pressure, but may be conducted at increased pressure or in a vacuum.

The proportions of the compound (3) and compound (4) to metallic tellurium are 0.5 to 1.5 moles of the compound (3) and 0.5 to 1.5 moles of the compound (4), preferably 0.8 to 1.2 moles of the compound (3) and 0.8 to 1.2 moles of the compound (4), per mole of metallic tellurium.

After the completion of the reaction, the solvent is concentrated, and the desired compound is isolated and purified. Although the method of purification can be determined suitably depending on the compound, usually vacuum distillation or recrystallization is preferable.

The vinyl monomer to be used in the present invention is not particularly limited insofar as the monomer can be subjected to radical polymerization. Examples of vinyl monomers usable are methyl (meth)acrylate, ethyl (meth)acrylate, propyl (meth)acrylate, butyl (meth)acrylate, octyl (meth)acrylate, lauryl (meth)acrylate, (meth)acrylic acid 2-hydroxyethyl ester [2-hydroxyethyl(meth)acrylate] and like (meth)acrylic acid esters, cyclohexyl (meth)acrylate, methylcyclohexyl (meth)acrylate, isobornyl (meth)acrylate, cyclododecyl (meth)acrylate and like cycloalkyl-containing unsaturated monomers, (meth)acrylic acid, maleic acid, fumaric acid, itaconic acid, citraconic acid, crontonic acid, maleic anhydride and like carboxyl-containing unsaturated monomers, N,N-dimethylaminopropyl(meth)acrylamide, N,N-dimethylaminoethyl(meth)acrylamide, 2-(dimethylamino)ethyl (meth)acrylate, N,N-dimethylaminopropyl (meth)acrylate and like unsaturated monomers containing a tertiary amine, N-2-hydroxy-3-acryloyloxypropyl-N,N,N-trimethylammonium chloride, N-methacryloylaminoethyl-N,N,N-dimethylbenzylammonium chloride and like unsaturated monomers containing quaternary ammonium base, glycidyl (meth)acrylate and like epoxy-containing unsaturated monomers, styrene, α-methylstyrene, 4-methylstyrene, 2-methylstyrene, 3-methylstyrene, 4-methoxystyrene, 2-hydroxymethylstyrene, 2-chlorostyrene, 4-chlorostyrene, 2,4-dichlorostyrene, 1-vinylnaphthalene, divinylbenzene, p-styrenesulfonic acid or an alkali metal salt thereof (sodium salt or potassium salt, etc.) and like aromatic unsaturated monomers (styrene type monomer), 2-vinylthiophene, N-methyl-2-vinylpyrrole and like unsaturated monomers containing a heterocyclic ring, N-vinylformaldehyde, N-vinylacetamide and like vinylamides, 1-hexane, 1-octene, 1-decene and like α-olefins, butadiene, isoprene, 4-methyl-1,4-hexadiene, 7-methyl-1,6-octadiene and like dienes, methyl vinyl ketone, ethyl vinyl ketone and like unsaturated monomers containing a carbonyl group, vinyl acetate, vinyl benzoate, hydroxyethyl (meth)acrylate, (meth)acrylonitrile, (meth)acrylamide, N-methyl(meth)acrylamide, N-isopropyl-(meth)acrylamide, N,N-dimethyl(meth)acrylamide and like (meth)acrylamide type monomers, vinyl chloride, etc.

Preferable among these are (meth)acrylic acid ester monomers, unsaturated monomers containing a tertiary amine, aromatic unsaturated monomers (styrene type monomers), unsaturated monomers containing a carbonyl group, acrylamide, (meth)acrylamide and N,N-dimethylacrylamide. Particularly preferable are (meth)acrylic acid ester monomers, aromatic unsaturated monomers (styrene type monomers), unsaturated monomers containing a carbonyl group, (meth)acrylonitrile, (meth)acrylamide type monomers.

Examples of preferable (meth)acrylic acid ester monomers are methyl (meth)acrylate, ethyl (meth)acrylate, propyl (meth)acrylate, butyl (meth)acrylate and (meth)acrylic acid 2-hydroxyethyl ester [2-hydroxyethyl(meth)acrylate]. Especially preferable are methyl (meth)acrylate and butyl (meth)acrylate. Among these preferable are methyl methacrylate, ethyl methacrylate, propyl methacrylate, butyl methacrylate and methacrylic acid 2-hydroxyethyl ester [2-hydroxyethyl methacrylate].

Examples of preferable unsaturated monomers containing a tertiary amine are N,N-dimethylaminoethyl(meth)acrylamide and 2-(dimethylamino)ethyl(meth)acrylate.

Examples of preferable styrene type monomers are styrene, α-methylstyrene, o-methylstyrene, p-methylstyrene, p-methoxystyrene, p-t-butylstyrene, p-n-butylstyrene p-chlorostyrene, and p-styrenesulfonic acid or an alkali metal salt thereof (sodium salt or potassium salt, etc.). More preferable are styrene, p-methoxysytrene and p-chlorostyrene. The term "(meth)acrylic acid" refers collectively to "acrylic acid" and "methacrylic acid."

Examples of compounds represented by the formula (2) and useful for the present invention are as follows

$(R^1Te)_2$        (2)

wherein $R^1$ is the same as above.

The groups $R^1$ is the same as shown above.

Examples of preferred compounds represented by the formula (2) are those wherein $R^1$ is $C_1$-$C_4$ alkyl or phenyl.

More specific examples of compounds represented by the formula (2) are dimethyl ditelluride, diethyl ditelluride, di-n-propyl ditelluride, diisopropyl ditelluride, dicyclopropyl ditelluride, di-n-butyl ditelluride, di-sec-butyl ditelluride, di-tert-butyl ditelluride, dicyclobutyl ditelluride, diphenyl ditelluride, bis(p-methoxyphenyl)ditelluride, bis(p-aminophenyl) ditelluride, bis(p-nitrophenyl)ditelluride, bis(p-cyanophenyl)ditelluride, bis(p-sulfonylphenyl)ditelluride, dinaphthyl ditelluride, dipyridyl ditelluride, etc. Preferable among these are dimethyl ditelluride, diethyl ditelluride, di-n-propyl ditelluride, di-n-butyl ditelluride and diphenyl ditelluride. More preferable are dimethyl ditelluride, diethyl ditelluride, di-n-propyl ditelluride and di-n-butyl ditelluride.

Such compounds are prepared, for example, by reacting metallic tellurium with a compound represented by the formula (4).

Metallic tellurium is suspended in a solvent. Examples of solvents usable are dimethylformamide (DMF), tetrahydrofuran (THF) and like polar solvents, toluene, xylene and like aromatic solvents, hexane and like aliphatic hydrocarbons, dialkyl ethers and like ethers. THF is preferable among these. The organic solvent is used usually in an amount of 1 to 100 ml, preferably 5 to 10 ml, per gram of metallic tellurium although the amount is suitably adjustable.

The compound represented by the formula (4) is slowly added dropwise to the suspension, followed by stirring. The reaction time is usually 5 minutes to 24 hours, preferably 10 minutes to 2 hours, although varying with the reaction temperature and pressure. The reaction temperature is −20° C. to 80° C., preferably 15° C. to 40° C., more preferably room temperature. The reaction is conducted usually at atmospheric pressure, but an increased or reduced pressure is usable.

Subsequently, water (which may be neutral water such as saline solution, alkali water such as aqueous solution of ammonium chloride, or acid water such as aqueous solution of hydrochloric acid) is added to the reaction mixture, followed by stirring. Although varying with the reaction temperature or pressure, the reaction time is usually 5 minutes to 24 hours, preferably 10 minutes to 2 hours. The reaction temperature is −20° C. to 80° C., preferably 15° C. to 40° C., more preferably room temperature. The reaction is conducted usually at atmospheric pressure, but an increased or reduced pressure is usable.

Metallic tellurium and the compound of the formula (4) are used in such a ratio that 0.5 to 1.5 moles, preferably 0.8 to 1.2 moles, of the compound of the formula (4) is used per mole of metallic tellurium.

After the completion of the reaction, the solvent is concentrated, and the desired product is isolated from the concentrate and purified. Although the compound can be purified by a suitably selected method, vacuum distillation or reprecipitation purification is usually desirable.

Specifically stated, the living radical polymer of the present invention is produced by the process to be described below.

A vinyl monomer, a living radical polymerization initiator represented by the formula (1) and a compound represented by the formula (2) are mixed together in a container having its inside air replaced by an inert gas. At this time, the initiator represented by the formula (1) and the compound of the formula (2) may be mixed together by stirring as the first step, followed by the second step of adding the vinyl monomer to the mixture. Examples of inert gases usable at this time are nitrogen, argon, helium, etc., among which argon and nitrogen are preferred. Nitrogen is especially preferred.

Although the vinyl monomer and the initiator represented by the formula (1) are used in amounts which are suitably adjusted depending on the molecular weight and molecular weight distribution of the living radical polymer to be obtained, usually 5 to 10,000 moles, preferably 50 to 5,000 moles, of the vinyl monomer is used per mole of the initiator represented by the formula (1).

To obtain a preferred mixture of living radical polymerization initiator of the formula (1) and compound of the formula (2), it is desirable to use an organotellurium compound of the formula (1) wherein $R^1$ is $C_1$-$C_4$ alkyl, $R^2$ and $R^3$ are each a hydrogen atom or $C_1$-$C_4$ alkyl, and $R^4$ is aryl, substituted aryl or oxycarbonyl and a compound of the formula (2) wherein $R^1$ is $C_1$-$C_4$ alkyl or phenyl.

The living radical polymerization initiator represented by the formula (1) and the compound represented by the formula (2) are used in the ratio of usually 0.1 to 100 moles, preferably 0.5 to 100 moles, more preferably 1 to 10 moles, especially preferably 1 to 5 moles, of the compound of the formula (2) per mole of the initiator of the formula (1).

The polymerization reaction is conducted usually in the absence of solvent, while an organic solvent generally in use for radical polymerization may be used. Examples of solvents usable are benzene, toluene, N,N-dimethylformamide (DMF), dimethyl sulfoxide (DMSO), acetone, chloroform, carbon tetrachloride, tetrahydrofuran (THF), ethyl acetate, trifluoromethylbenzene, etc. Aqueous solvents are also usable which include, for example, water, methanol, ethanol, isopropanol, n-butanol, ethyl cellosolve, butyl cellosolve, 1-methoxy-2-propanol, etc. The amount of the solvent to be used is adjusted suitably. For example, 0.01 to 100 ml, preferably 0.05 to 10 ml, more preferably 0.05 to 0.5 ml, of the solvent is used per gram of the vinyl monomer.

Next, the mixture is then stirred. The reaction temperature and the reaction time may be adjusted suitably in accordance with the molecular weight or molecular weight distribution of the living radical polymer to be obtained. The mixture is stirred usually at 60 to 150° C. for 5 to 100 hours, preferably at 80 to 120° C. for 10 to 30 hours. The reaction is conducted usually under atmospheric pressure, but may be conducted at increased pressure or in a vacuum.

After the completion of the reaction, the solvent used and the remaining monomer are removed in a vacuum to take out the desired polymer, or the desired product is isolated by re-precipitation using a solvent wherein the product is insoluble. The reaction mixture can be treated by any method insofar as it causes no problem to the desired product.

Different kinds of vinyl monomers are usable in the process of the invention for preparing a living radical polymer. For example when at least two kinds of vinyl monomers are reacted at the same time, a random copolymer can be obtained. The random copolymer obtained is a polymer which comprises the reacted monomers in the original ratio (mole ratio) regardless of the kinds of the monomers. When a random copolymer is obtained by reacting a vinyl monomer A and a vinyl monomer B at the same time, the copolymer has substantially the same material ratio (mole ratio). Further when two kinds of vinyl monomers are reacted in succession, a block copolymer can be obtained. The block copolymer is provided by the same order of reacted monomers regardless of the kinds of the monomers. If a vinyl monomer A and a vinyl monomer B are reacted in succession to obtain a block copolymer, the polymer obtained is in the order of A-B or B-A in conformity with the order of monomers reacted.

The living radical polymerization initiator of the present invention is adapted for excellent control of molecular weights and molecular weight distributions under very mild conditions.

The living radical polymer to be obtained by the invention is adjustable in molecular weight according to the reaction time, the amount of the living radical polymerization initiator (organotellurium compound) of the formula (1) and the amount of the compound of the formula (2), and can be 500 to 1,000,000 in number average molecular weight. The invention is especially suitable for producing living radical polymers having a number average molecular weight of 1,000 to 500,000, more preferably 1,000 to 50,000.

The living radical polymer to be obtained by the invention is controlled to 1.05 to 1.50 in molecular weight distribution (PD=Mw/Mn). The molecular weight distribution is controllable to a narrower range of 1.05 to 1.30, a further narrower range of 1.05 to 1.20, a still narrower range of 1.05 to 1.15.

It has been found that the living radical polymer of the present invention has a terminal group which is an alkyl, aryl, substituted aryl, aromatic heterocyclic group, acyl, oxycarbonyl or cyano derived from the organotellurium compound and a growth terminal which is highly reactive tellurium. Accordingly, the organotellurium compound used for radical polymerization makes it easier to convert the terminal group to other functional group than in the case of the living radical polymer obtained by conventional living radical polymerization. The living radical polymer obtained according to the invention is therefore usable as a macro living radical polymerization initiator (macroinitiator).

A-B diblock copolymers such as methyl methacrylate-styrene and B-A diblock copolymers such as styrene-methyl methacrylate can be obtained using a macro living radical polymerization initiator of the invention. A-B-A triblock copolymers such as methyl methacrylate-styrene-methyl methacrylate and A-B-C triblock copolymers such as methyl methacrylate-styrene-butyl acrylate are also available. This is attributable to the fact that the vinyl monomers of various different types are controllable by the living radical polymerization initiator and the ditellurium compound of the invention, and also to the fact that highly reactive tellurium is present at the growth terminal of the living radical polymer obtained with use of the living radical polymerization initiator.

Stated more specifically, block copolymers are prepared by the processes to be described below.

For preparing A-B diblock copolymers such as methyl methacrylate-styrene copolymer, methyl methacrylate, a living radical polymerization initiator represented by the formula (1) and a compound represented by the formula (2) are mixed together first as in the process described above for preparing a living radical polymer to obtain poly(methyl methacrylate), and subsequently mixing styrene with the polymer to obtain methyl methacrylate-styrene copolymer.

A-B-A triblock copolymers and A-B-C triblock copolymers can be produced, for example, by preparing an A-B diblock copolymer by the above process and thereafter mixing a vinyl monomer (A) or vinyl monomer (C) with the copolymer to obtain the A-B-A or A-B-C triblock copolymer.

In producing the diblock copolymer according to the invention, the compound of the formula (1) and the compound of the formula (2) can be used when a homopolymer is prepared from the first monomer and/or when the diblock copolymer is subsequently prepared.

Further in producing the triblock copolymer according to the invention the compound of the formula (1) and the compound of the formula (2) can be used at least once when a homopolymer is prepared from the first monomer, or when a diblock copolymer is subsequently prepared, or when the triblock copolymer is subsequently prepared.

The preparation of each block may be followed directly by the subsequent reaction for the next block, or the subsequent reaction for the next block may be initiated after the purification of the product resulting from the completion of the first reaction. The block copolymer can be isolated by a usual method.

BEST MODE OF CARRYING OUT THE INVENTION

The present invention will be described below in detail with reference to Examples, but is not limited thereto in any way. In Examples and Comparative Examples, properties were determined by the following methods.

(1) Identification of Organotellurium Compounds and Living Radical Polymers

The organotellurium compound was identified based on the results of $^1$H-NMR, $^{13}$C-NMR, IR and MS analyses. The molecular weight and molecular weight distribution of the living radical polymer were determined using GPC (gel permeation chromatography). The measuring instruments used are as follows.

$^1$H-NMR: Varian Gemini 2000 (300 MHz for $^1$H), JEOL JNM-A400 (400 MHz for $^1$H) $^{13}$C-NMR: Varian Gemini 2000, JEOL JNM-A400 IR: Shimadzu FTIR-8200 (cm$^{-1}$) MS (HRMS): JEOL JMS-300

Molecular weight and molecular weight distribution: liquid chromatography Shimadzu LC-10 (column: Shodex K-804L+K-805L, polystyrene standard: TOSOH TSK Standard, polymethyl methacrylate standard: Shodex Standard M-75)

PREPARATION EXAMPLE 1

Preparation of (1-methyltellanyl-ethyl)benzene

A 6.38 g quantity (50 mmoles) of metallic tellurium [product of Aldrich, brand name: Tellurium (−40 mesh)] was suspended in 50 ml of THF, and 52.9 ml (1.04 M diethyl ether solution, 55 mmoles) of methyllithium (product of Kanto Chemical Co., Ltd., diethyl ether solution) was slowly added dropwise to the suspension at room temperature (for 10 minutes). The reaction mixture was stirred until the metallic tellurium disappeared completely (for 20 minutes). To the reaction mixture was added 11.0 g (60 mmoles) of (1-bromoethyl)benzene at room temperature, followed by stirring for 2 hours. After the completion of reaction, the solvent was concentrated in a vacuum, followed by vacuum distillation to give 8.66 g of yellow oil (70% in yield).

IR, HRMS, $^1$H-NMR and $^{13}$C-NMR analyses indicated that the product was (1-methyltellanyl-ethyl)benzene.

IR (neat, cm$^{-1}$) 1599, 1493, 1451, 1375, 1219, 1140, 830, 760, 696, 577 HRMS (EI) m/z: Calcd for $C_9H_{12}Te(M)^+$, 250.0001; Found 250.0001. $^1$H-NMR (300 MHz, CDCl$_3$) 1.78 (s, 3H, TeCH$_3$), 1.90 (d, J=7.2 Hz, 3H), 4.57 (q, J=7.2 Hz, 1H, CHTe), 7.08-7.32 (m, 5H) $^{13}$C-NMR (75 MHz, CDCl$_3$) −18.94, 18.30, 23.89, 126.17, 126.80, 128.30, 145.79

PREPARATION EXAMPLE 2

Preparation of ethyl-2-methyl-2-methyltellanyl-propionate

The same procedure as in Preparation Example 1 was performed with the exception of using 10.7 g (55 mmoles) of ethyl-2-bromo-isobutyrate in place of (1-bromoethyl)benzene to obtain 6.53 g (51% in yield) of yellow oil.

IR, HRMS, $^1$H-NMR and $^{13}$C-NMR analyses indicated that the product was ethyl-2-methyl-2-methyltellanyl-propionate. IR (neat, cm$^{-1}$) 1700, 1466, 1385, 1269, 1146, 1111, 1028 HRMS (EI) m/z: Calcd for $C_7H_{14}O_2Te(M)^+$, 260.0056; Found 260.0053. $^1$H-NMR (300 MHz, CDCl$_3$) 1.27 (t, J=6.9 Hz, 3H), 1.74 (s, 6H), 2.15 (s, 3H, TeCH$_3$), 4.16 (q, J=7.2 Hz, 2H) $^{13}$C-NMR (75 MHz, CDCl$_3$)-17.38, 13.89, 23.42, 27.93, 60.80, 176.75

PREPARATION EXAMPLE 3

Dimethyl Ditelluride

A 3.19 g quantity (25 mmoles) of metallic tellurium (the same as above) was suspended in 25 ml of THF, and 25 ml (28.5 mmoles) of methyllithium (the same as above) was added slowly to the suspension at 0° C. (over a period of 10 minutes). The reaction mixture was stirred until the metallic tellurium disappeared completely (for 10 minutes). To the resulting reaction mixture was added 20 ml of a solution of ammonium chloride at room temperature, followed by stirring for 1 hour. The organic layer was separated off, and the aqueous layer was subjected to extraction with diethyl ether 3 times. The organic layers were collected, dried over anhydrous sodium sulfate and concentrated in a vacuum, affording 2.69 g (9.4 mmoles, yield 75%) of blackish purple oil.

The product was found to be dimethyl ditelluride by MS (HRMS) and $^1$H-NMR.

HRMS (EI) m/z: Calcd for $C_2H_6Te_2(M)^+$, 289.8594; Found 289.8593. $^1$H-NMR (300 MHz, CDCl$_3$) 2.67 (s, 6H)

PREPARATION EXAMPLE 4

Diphenyl Ditelluride

A 3.19 g quantity (25 mmoles) of metallic tellurium (the same as above) was suspended in 25 ml of THF, and 15.8 ml (28.5 mmoles) of phenyllithium [product of Aldrich, 1.8M-cyclohexane/ether (70:30) solution] was added slowly to the suspension at 0° C. (over a period of 10 minutes). The reaction mixture was stirred until the metallic tellurium disappeared completely (for 10 minutes). To the resulting reaction mixture was added 20 ml of a solution of ammonium chloride at room temperature, followed by stirring for 1 hour. The organic layer was separated off, and the aqueous layer was subjected to extraction with diethyl ether 3 times. The organic layers were collected, dried over anhydrous sodium sulfate and concentrated in a vacuum, affording 3.48 g (8.5 mmoles, yield 68%) of blackish purple oil.

The product was found to be diphenyl ditelluride by MS (HRMS) and $^1$H-NMR.

EXAMPLES 1 TO 4

Preparation of poly(methyl methacrylate)

Along with 24.8 mg (0.10 mmole) of the (1-methyltellanyl-ethyl)benzene prepared in Preparation Example 1, methyl methacrylate [stabilized with hydroquinone (HQ)] and a solution of the dimethyl ditelluride prepared in Preparation Example 3 were placed in the ratio listed in Table 1 into a glove box with the inside air replaced by nitrogen, followed by stirring. After the completion of the reaction, the reaction mixture was dissolved in 5 ml of chloroform, and the solution was then poured into 250 ml of hexane which was being stirred. The resulting polymer precipitate was collected by suction filtration and dried to obtain poly(methyl methacrylate).

Table 1 shows the result of GPC analysis [with reference to the molecular weight of an authentic sample of poly(methyl methacrylate)].

TABLE 1

| Ex. | methyl methacrylate | dimethyl ditelluride | reaction condition | yield (%) | Mn | PD |
|---|---|---|---|---|---|---|
| 1 | 1.01 g (10 mmol) | 28.5 mg (0.10 mmol) | 80° C. 13 h | 92 | 9700 | 1.18 |
| 2 | 2.02 g (20 mmol) | 28.5 mg (0.10 mmol) | 80° C. 13 h | 83 | 16100 | 1.14 |
| 3 | 5.05 g (50 mmol) | 57.0 mg (0.20 mmol) | 80° C. 18 h | 79 | 36300 | 1.18 |
| 4 | 10.10 g (100 mmol) | 57.0 mg (0.20 mmol) | 80° C. 24 h | 83 | 79400 | 1.14 |

COMPARATIVE EXAMPLE 1

Preparation of poly(methyl methacrylate)

Poly(methyl methacrylate) was prepared in the same manner as in Example 1 except that no dimethyl ditelluride was used (67% in yield).

GPC analysis [with reference to the molecular weight of an authentic sample of poly(methyl methacrylate)] revealed Mn 8100 and PD=1.77.

A comparison between Example 1 and Comparative Example 1 indicates that when dimethyl telluride was used as a compound represented by the formula (2), a living radical polymer of narrower molecular weight distribution (PD value closer to 1) is obtained.

EXAMPLE 5

Preparation of poly(methyl methacrylate)

A 25.8 mg quantity (0.10 mmole) of the ethyl-2-methyl-2-methyltellanyl-propionate prepared in Preparation Example 2, 1.01 g (10 mmoles) of methyl methacrylate and a solution of 28.5 mg (0.10 mmole) of the dimethyl ditelluride prepared in Preparation Example 3 were stirred at 80° C. for 13 hours within a glove box having its inside air replaced by nitrogen. After the completion of the reaction, the reaction mixture was dissolved in 5 ml of chloroform, and the solution was thereafter poured into 250 ml of hexane being stirred. The resulting polymer precipitate was collected by suction filtration and dried, affording 0.85 g (yield 84%) of poly(methyl methacrylate).

GPC analysis [with reference to the molecular weight of an authentic sample of poly(methyl methacrylate)] revealed Mn 8200 and PD=1.16.

EXAMPLE 6

Preparation of poly(ethyl methacrylate)

A 25.8 mg quantity (0.10 mmole) of the ethyl-2-methyl-2-methyltellanyl-propionate prepared in Preparation Example 2, 1.14 g (10 mmoles) of ethyl methacrylate (stabilized with HQ) and a solution of 28.5 mg (0.10 mmole) of the dimethyl ditelluride prepared in Preparation Example 3 were stirred at 105° C. for 2 hours within a glove box having its inside air replaced by nitrogen. After the completion of the reaction, the reaction mixture was dissolved in 5 ml of chloroform, and the solution was thereafter poured into 250 ml of hexane being stirred. The resulting polymer precipitate was collected by suction filtration and dried, affording 1.11 g (yield 97%) of poly(ethylmethacrylate).

GPC analysis [with reference to the molecular weight of an authentic sample of poly(methyl methacrylate)] revealed Mn 10600 and PD=1.12.

EXAMPLE 7

Preparation of poly(2-hydroxyethyl methacrylate)

In 1 ml of N,N-dimethylformamide (DMF) were dissolved 25.8 mg (0.10 mmole) of the ethyl-2-methyl-2-methyltellanyl-propionate prepared in Preparation Example 2, 1.30 g (10 mmoles) of 2-hydroxyethyl methacrylate [stabilized with hydroquinone methyl ether (MEHQ)] and 28.5 mg (0.10 mmole) of the dimethyl ditelluride prepared in Preparation Example 3 in a glove box having its inside air replaced by nitrogen. The solution was stirred at 80° C. for 8 hours. After the completion of the reaction, the solvent was removed by distillation in a vacuum, affording 1.26 g (yield 97%) of poly(2-hydroxyethyl methacrylate).

GPC analysis [with reference to the molecular weight of an authentic sample of poly(methyl methacrylate)] revealed Mn 22300 and PD=1.27.

EXAMPLE 8

Preparation of Polystyrene

A 24.8 mg quantity (0.10 mmole) of the (1-methyltellanyl-ethyl)benzene prepared in Preparation Example 1, 1.04 g (10 mmoles) of styrene and a solution of 28.5 mg (0.10 mmole) of the dimethyl ditelluride prepared in Preparation Example 3 were stirred at 120° C. for 14 hours within a glove box having its inside air replaced by nitrogen. After the completion of the reaction, the reaction mixture was dissolved in 5 ml of chloroform, and the solution was thereafter poured into 250 ml of hexane being stirred. The resulting polymer precipitate was collected by suction filtration and dried, affording 1.01 g (yield 97%) of polystyrene.

GPC analysis (with reference to the molecular weight of an authentic sample of polystyrene) revealed Mn 9000 and PD=1.18.

EXAMPLE 9

Preparation of Polystyrene

A 24.8 mg quantity (0.10 mmole) of the (1-methyltellanyl-ethyl)benzene prepared in Preparation Example 1, 1.04 g (10 mmoles) of styrene and a solution of 40.9 mg (0.10 mmole) of the diphenyl ditelluride prepared in Preparation Example 4 were stirred at 120° C. for 14 hours within a glove box having its inside air replaced by nitrogen. After the completion of the reaction, the reaction mixture was dissolved in 5 ml of chloroform, and the solution was thereafter poured into 250 ml of hexane being stirred. The resulting polymer precipitate was collected by suction filtration and dried, affording 0.99 g (yield 95%) of polystyrene.

GPC analysis (with reference to the molecular weight of an authentic sample of polystyrene) revealed Mn 9200 and PD=1.13.

EXAMPLE 10

Preparation of poly(methyl methacrylate-b-styrene) diblock polymer

A 1.01 g quantity (10 mmoles) of methyl methacrylate, 24.8 mg (0.10 mmole) of the (1-methyltellanyl-ethyl)benzene prepared in Preparation Example 1 and 28.5 mg (0.10 mmole) of the dimethyl ditelluride prepared in Preparation Example 3 were reacted at 100° C. for 24 hours in a glove box having its inside air replaced by nitrogen. After the completion of the reaction, the reaction mixture was dissolved in 5 ml of deuterochloroform, and the solution was thereafter poured into 300 ml of hexane being stirred. The resulting polymer precipitate was collected by suction filtration and dried, affording 0.765 g (yield 86%) of poly(methyl methacrylate).

GPC analysis revealed Mn 8500 and PD=1.12.

Next, 425 mg (0.05 mmole) of the poly(methyl methacrylate) (used as a macroinitiator) obtained above and 520 mg (5 mmoles) of styrene were reacted at 100° C. for 24 hours. After the completion of the reaction, the reaction mixture was dissolved in 5 ml of chloroform, and the solution was thereafter poured into 300 ml of hexane being stirred. The resulting polymer precipitate was collected by suction filtration and dried, affording 0.5353 g (yield 57%) of poly(methyl methacrylate-b-styrene) diblock polymer. GPC analysis revealed Mn 18700 and PD=1.18.

PREPARATION EXAMPLE 5

Preparation of
1-chloro-4-(1-methyltellanyl-ethyl)benzene

A 4.08 g quantity (32 mmoles) of metallic tellurium (the same as above) was suspended in 50 ml of THF, and 29.2 ml (35 mmoles of 1.20M diethyl ether solution) of methyllithium was slowly added dropwise to the suspension at 0° C. (over a period of 10 minutes). The reaction mixture was stirred until the metallic tellurium disappeared completely (for 15 minutes). To the reaction mixture was added 7.68 g (35 mmoles) of 1-(1-bromoethyl)-4-chlorobenzene at 0° C., followed by stirring at room temperature for 1.5 hours. After the completion of the reaction, the solvent was concentrated in a vacuum, and the concentrate was then distilled in a vacuum, giving 3.59 g (yield 40%) of orange oil.

IR, HRMS, $^1$H-NMR and $^{13}$C-NMR indicated that the product was 1-chloro-4-(1-methyltellanyl-ethyl)benzene.

IR (neat, cm$^{-1}$) 1891, 1686, 1489, 1408, 1096, 828 HRMS (EI) m/z: Calcd for $C_9H_{11}ClTe(M)^+$, 283.9.612; Found 283.9601 $^1$H-NMR (300 MHz, CDCl$_3$) 1.81 (s, 3H), 1.88 (d, J=7.2 Hz, 3H), 4.54 (q, J=7.2 Hz, H), 7.23 (s, 5H) $^{13}$C-NMR (100 MHz, CDCl$_3$)-18.80, 17.18, 23.81, 128.08, 128.39, 131.51, 144.45.

PREPARATION EXAMPLE 6

Preparation of 1-(1-methyltellanyl-ethyl)-4-trifluoromethylbenzene

A 5.74 g quantity (45 mmoles) of metallic tellurium (the same as above) was suspended in 60 ml of THF, and 45.5 ml (50 mmoles of 1.10M diethyl ether solution) of methyllithium was slowly added dropwise to the suspension at 0° C. (over a period of 10 minutes). The reaction mixture was stirred until the metallic tellurium disappeared completely (for 20 minutes). To the reaction mixture was added 11.4 g (45 mmoles) of 1-(1-bromoethyl)-4-trifluoromethylbenzene at 0° C., followed by stirring at room temperature for 1.5 hours. After the completion of the reaction, the solvent was concentrated in a vacuum, and the concentrate was then distilled in a vacuum, giving 2.40 g (yield 17%) of yellow oil.

IR, HRMS, $^1$H-NMR and $^{13}$C-NMR indicated that the product was 1-(1-methyltellanyl-ethyl)-4-trifluoromethylbenzene.

IR (neat, cm$^{-1}$) 1918, 1698, 1617, 1416, 1325, 841 HRMS (EI) m/z: Calcd for $C_{10}H_{11}F_3Te(M)^+$, 317.9875; Found 317.9877 $^1$H-NMR (300 MHz, CDCl$_3$) 1.84 (s, 3H), 1.92 (d, J=6.9, 3H), 4.59 (q, J=7.3 Hz, 1H), 7.39 (d, J=8.1 Hz, 2H), 7.53 (d, J=8.4 Hz, 2H) $^{13}$C-NMR (100 MHz, CDCl$_3$) −18.72, 17.17, 23.51, 122.83, 125.55 (q, $J_{C-F}$=3.8 Hz), 127.04, 128.29 (q, $J_{C-F}$=32.2 Hz), 150.18 (q, $J_{C-F}$=1.3 Hz).

PREPARATION EXAMPLE 7

Preparation of 1-(1-methyltellanyl-ethyl)-3,5-bis-trifluoromethylbenzene

A 4.59 g quantity (36 mmoles) of metallic tellurium (the same as above) was suspended in 60 ml of THF, and 36.7 ml (40 mmoles of 1.20M diethyl ether solution) of methyllithium was slowly added dropwise to the suspension at 0° C. (over a period of 10 minutes). The reaction mixture was stirred until the metallic tellurium disappeared completely (for 10 minutes). To the reaction mixture was added 12.8 g (40 mmoles) of 1-(1-bromoethyl)-3,5-bis-trifluoromethyl-benzene at 0° C., followed by stirring at room temperature for 2 hours. After the completion of the reaction, the solvent was concentrated in a vacuum, and the concentrate was then distilled in a vacuum, giving 4.63 g (yield 30%) of orange oil.

IR, HRMS, $^1$H-NMR and $^{13}$C-NMR indicated that the product was 1-(1-methyltellanyl-ethyl)-3,5-bis-trifluoromethylbenzene.

IR (neat, cm$^{-1}$) 1620, 1468, 1375, 1279, 1175, 893 HRMS (EI) m/z: Calcd for $C_{11}H_{10}F_6Te(M)^+$, 385, 9749; Found 385.9749 $^1$H-NMR (300 MHz, CDCl$_3$) 1.87 (s, 3H), 1.95 (d, J=7.2, 3H), 4.62 (q, J=7.3 Hz, 1H), 7.68 (s, 1H), 7.70 (s, 2H) $^{13}$C-NMR (100 MHz, CDCl$_3$)-18.49, 16.14, 23.33, 120.2 (hept, $J_{C-F}$=3.8 Hz), 121.94, 124.65, 126.75, 131.64 (q, $J_{C-F}$=32.9 Hz), 148.96.

PREPARATION EXAMPLE 8

Preparation of 1,2,3,4,5-pentafluoro-6-(1-methyltellanyl-ethyl)benzene

A 5.74 g quantity (45 mmoles) of metallic tellurium (the same as above) was suspended in 60 ml of THF, and 42.0 ml (50 mmoles of 1.20M diethyl ether solution) of methyllithium was slowly added dropwise to the suspension at 0° C. (over a period of 10 minutes). The reaction mixture was stirred until the metallic tellurium disappeared completely (for 30 minutes). To the reaction mixture was added 12.4 g (45 mmoles) of 1,2,3,4,5-pentafluoro-6-(1-bromoethyl)benzene at 0° C., followed by stirring at room temperature for 2 hours. After the completion of the reaction, the solvent was concentrated in a vacuum, and the concentrate was then distilled in a vacuum, giving 2.86 g (yield 19%) of orange oil.

IR, HRMS, $^1$H-NMR and $^{13}$C-NMR indicated that the product was 1,2,3,4,5-pentafluoro-6-(1-methyltellanyl-ethyl)benzene.

IR (neat, cm$^{-1}$) 1653, 1522, 1499, 1144, 1075, 1048, 984, 903 HRMS (EI) m/z: Calcd for $C_9H_7F_5Te(M)^+$, 339.9530; Found 339.9535 $^1$H-NMR (300 MHz, CDCl$_3$) 1.93 (d, J=7.2 Hz, 3H), 2.05 (s, 3H), 4.65 (q, J=7.5 Hz, 1H) $^{13}$C-NMR (100 MHz, CDCl$_3$)-19.07, 2.01, 22.38, 120.79-121.14 (m), 137.59 (dddd, $J_{C-F}$=261 Hz), 139.52 (dtt, $J_{C-F}$=249 Hz), 143.38 (dm, $J_{C-F}$=248 Hz)

PREPARATION EXAMPLE 9

Preparation of
1-methoxy-4-(1-methyltellanyl-ethyl)benzene

A 7.66 g quantity (60 mmoles) of metallic tellurium (the same as above) was suspended in 50 ml of THF, and 55.0 ml (66 mmoles of 1.20M diethyl ether solution) of methyllithium was slowly added dropwise to the suspension at 0° C. (over a period of 10 minutes). The reaction mixture was stirred until the metallic tellurium disappeared completely (for 30 minutes). To the reaction mixture was added 12.9 g (60 mmoles) of 1-(1-bromoethyl)-4-methoxybenzene at 0° C., followed by stirring at room temperature for 1.5 hours. After the completion of the reaction, the solvent was concentrated in a vacuum, and the concentrate was then distilled in a vacuum, giving 10.8 g (yield 40%) of orange oil.

IR, HRMS, $^1$H-NMR and $^{13}$C-NMR indicated that the product was 1-methoxy-4-(1-methyltellanyl-ethyl)benzene.

IR (neat, cm⁻¹) 1609, 1509, 1248, 1177, 1040, 830 HRMS (EI) m/z: Calcd for $C_{10}H_{14}OTe(M)^+$, 281.0107; Found 281.0106 ¹H-NMR (300 MHz, CDCl₃) 1.78 (s, 3H), 1.89 (d, J=7.2 Hz, 3H), 4.58 (q, J=7.3 Hz, 1H), 6.83 (d, J=8.4 Hz, 2H), 7.23 (d, J=9.0 Hz, 2H) ¹³C-NMR (100 MHz, CDCl₃)-18.98, 17.94, 24.30, 55.23, 113.70, 127.86, 137.95, 157.84.

PREPARATION EXAMPLE 10

Preparation of ethyl-2-methyl-2-n-butyltellanyl-propionate

A 6.38 g quantity (50 mmoles) of metallic tellurium (the same as above) was suspended in 50 ml of THF, and 34.4 ml (55 mmoles) of n-butyllithium (product of Aldrich, 1.6M hexane solution) was slowly added dropwise to the suspension at room temperature (over a period of 10 minutes). The reaction mixture was stirred until the metallic tellurium disappeared completely (for 20 minutes). To the reaction mixture was added 10.7 g (55 mmoles) of ethyl-2-bromo-isobutyrate at room temperature, followed by stirring for 2 hours. After the completion of the reaction, the solvent was concentrated in a vacuum, and the concentrate was subsequently distilled in a vacuum, giving 8.98 g (yield 59.5%) of yellow oil.

¹H-NMR indicated that the product was ethyl-2-methyl-2-n-butyltellanyl-propionate.

¹H-NMR (300 MHz, CDCl₃) 0.93 (t, J=7.5 Hz, 3H), 1.25 (t, J=7.2 Hz, 3H), 1.37 (m, 2H), 1.74 (s, 6H), 1.76 (m, 2H), 2.90 (t, J=7.5 Hz, 2H, CH₂Te), 4.14 (q, J=7.2 Hz, 2H)

PREPARATION EXAMPLE 11

Preparation of di-n-butyl Ditelluride

A 3.19 g quantity (25 mmoles) of metallic tellurium (the same as above) was suspended in 25 ml of THF, and 17.2 ml (27.5 mmoles) of n-butyllithium (product of Aldrich, 1.6M hexane solution) was added slowly to the suspension at 0° C. (over a period of 10 minutes). The reaction mixture was stirred until the metallic tellurium disappeared completely (for 10 minutes). To the resulting reaction mixture was added 20 ml of a solution of ammonium chloride at room temperature, followed by stirring for 1 hour. The organic layer was separated off, and the aqueous layer was subjected to extraction with diethyl ether 3 times. The organic layers were collected, dried over Glauber's salt and concentrated in a vacuum, affording 4.41 g (11.93 mmoles, yield 95%) of blackish purple oil.

The product was found to be di-n-butyl ditelluride by ¹H-NMR. ¹H-NMR (300 MHz, CDCl₃) 0.93 (t, J=7.3 Hz, 3H), 1.39 (m, 2H), 1.71 (m, 2H), 3.11 (t, J=7.6, 2H, CH₂Te)

EXAMPLE 11

Preparation of poly(methyl methacrylate)

A 28.4 mg quantity (0.10 mmole) of the 1-chloro-4-(1-methyltellanyl-ethyl)benzene prepared in Preparation Example 5, 1.01 g (10 mmoles) of methyl methacrylate and a solution of 28.5 mg (0.10 mmole) of the dimethyl ditelluride prepared in Preparation Example 3 were stirred at 80° C. for 13 hours within a glove box having its inside air replaced by nitrogen. After the completion of the reaction, the reaction mixture was dissolved in 5 ml of chloroform, and the solution was thereafter poured into 250 ml of hexane being stirred. The resulting polymer precipitate was collected by suction filtration and dried, affording poly(methyl methacrylate) in a yield of 71%.

GPC analysis [with reference to the molecular weight of an authentic sample of poly(methyl methacrylate)] revealed Mn 6000 and PD=1.12.

EXAMPLE 12

Preparation of poly(methyl methacrylate)

A 31.8 mg quantity (0.10 mmole) of the 1-(1-methyltellanyl-ethyl)-4-trifluoromethylbenzene prepared in Preparation Example 6, 1.01 g (10 mmoles) of methyl methacrylate and a solution of 28.5 mg (0.10 mmole) of the dimethyl ditelluride prepared in Preparation Example 3 were stirred at 80° C. for 13 hours within a glove box having its inside air replaced by nitrogen. After the completion of the reaction, the reaction mixture was dissolved in 5 ml of chloroform, and the solution was thereafter poured into 250 ml of hexane being stirred. The resulting polymer precipitate was collected by suction filtration and dried, affording poly(methyl methacrylate) in a yield of 93%.

GPC analysis [with reference to the molecular weight of an authentic sample of poly(methyl methacrylate)] revealed Mn 6800 and PD=1.16.

EXAMPLE 13

Preparation of poly(methyl methacrylate)

A 38.6 mg quantity (0.10 mmole) of the 1-(1-methyltellanyl-ethyl)-3,5-bis-trifluoromethylbenzene prepared in Preparation Example 7, 1.01 g (10 mmoles) of methyl methacrylate and a solution of 28.5 mg (0.10 mmole) of the dimethyl ditelluride prepared in Preparation Example 3 were stirred at 80° C. for 13 hours within a glove box having its inside air replaced by nitrogen. After the completion of the reaction, the reaction mixture was dissolved in 5 ml of chloroform, and the solution was thereafter poured into 250 ml of hexane being stirred. The resulting polymer precipitate was collected by suction filtration and dried, affording poly(methyl methacrylate) in a yield of 69%.

GPC analysis [with reference to the molecular weight of an authentic sample of poly(methyl methacrylate)] revealed Mn 6600 and PD=1.11.

EXAMPLE 14

Preparation of poly(methyl methacrylate)

A 34.0 mg quantity (0.10 mmole) of the 1,2,3,4,5-pentafluoro-6-(1-methyltellanyl-ethyl)benzene prepared in Preparation Example 8, 1.01 g (10 mmoles) of methyl methacrylate and a solution of 28.5 mg (0.10 mmole) of the dimethyl ditelluride prepared in Preparation Example 3 were stirred at 80° C. for 13 hours within a glove box having its inside air replaced by nitrogen. After the completion of the reaction, the reaction mixture was dissolved in 5 ml of chloroform, and the solution was thereafter poured into 250 ml of hexane being stirred. The resulting polymer precipitate was collected by suction filtration and dried, affording poly(methyl methacrylate) in a yield of 44%.

GPC analysis [with reference to the molecular weight of an authentic sample of poly(methyl methacrylate)] revealed Mn 5200 and PD=1.25.

EXAMPLE 15

Preparation of poly(methyl methacrylate)

A 28.1 mg quantity (0.10 mmole) of the 1-methoxy-4-(1-methyltellanyl-ethyl)benzene prepared in Preparation Example 9, 1.01 g (10 mmoles) of methyl methacrylate and a solution of 28.5 mg (0.10 mmole) of the dimethyl ditelluride prepared in Preparation Example 3 were stirred at 80° C. for 13 hours within a glove box having its inside air replaced by nitrogen. After the completion of the reaction, the reaction mixture was dissolved in 5 ml of chloroform, and the solution was thereafter poured into 250 ml of hexane being stirred. The resulting polymer precipitate was collected by suction filtration and dried, affording poly(methyl methacrylate) in a yield of 83%.

GPC analysis [with reference to the molecular weight of an authentic sample of poly(methyl methacrylate)] revealed Mn 6500 and PD=1.17.

EXAMPLE 16

Preparation of Polystyrene

A 24.8 mg quantity (0.10 mmole) of the (1-methyltellanyl-ethyl)benzene prepared in Preparation Example 1, 1.04 g (10 mmoles) of styrene and a solution of 28.5 mg (0.10 mmole) of the dimethyl ditelluride prepared in Preparation Example 3 were stirred at 100° C. for 20 hours within a glove box having its inside air replaced by nitrogen. After the completion of the reaction, the reaction mixture was dissolved in 5 ml of chloroform, and the solution was thereafter poured into 250 ml of hexane being stirred. The resulting polymer precipitate was collected by suction filtration and dried, affording polystyrene in a yield of 74%.

GPC analysis (with reference to the molecular weight of an authentic sample of polystyrene) revealed Mn 6500 and PD=1.10.

EXAMPLE 17

Preparation of Polystyrene

A 28.4 mg quantity (0.10 mmole) of the 1-chloro-4-(1-methyltellanyl-ethyl)benzene prepared in Preparation Example 5, 1.04 g (10 mmoles) of styrene and a solution of 28.5 mg (0.10 mmole) of the dimethyl ditelluride prepared in Preparation Example 3 were stirred at 100° C. for 20 hours within a glove box having its inside air replaced by nitrogen. After the completion of the reaction, the reaction mixture was dissolved in 5 ml of chloroform, and the solution was thereafter poured into 250 ml of hexane being stirred. The resulting polymer precipitate was collected by suction filtration and dried, affording polystyrene in a yield of 76%.

GPC analysis (with reference to the molecular weight of an authentic sample of polystyrene) revealed Mn 8100 and PD=1.14.

EXAMPLE 18

Preparation of poly(p-chlorostyrene)

A 24.8 mg quantity (0.10 mmole) of the (1-methyltellanyl-ethyl)benzene prepared in Preparation Example 1, 1.39 g (10 mmoles) of p-chlorostyrene and a solution of 28.5 mg (0.10 mmole) of the dimethyl ditelluride prepared in Preparation Example 3 were stirred at 100° C. for 17 hours within a glove box having its inside air replaced by nitrogen. After the completion of the reaction, the reaction mixture was dissolved in 5 ml of chloroform, and the solution was thereafter poured into 250 ml of hexane being stirred. The resulting polymer precipitate was collected by suction filtration and dried, affording poly(p-chlorostyrene) in a yield of 92%.

GPC analysis (with reference to the molecular weight of an authentic sample of polystyrene) revealed Mn 6400 and PD=1.14.

EXAMPLE 19

Preparation of poly(p-chlorostyrene)

A 28.4 mg quantity (0.10 mmole) of the 1-chloro-4-(1-methyltellanyl-ethyl)benzene prepared in Preparation Example 5, 1.39 g (10 mmoles) of p-chlorostyrene and a solution of 28.5 mg (0.10 mmole) of the dimethyl ditelluride prepared in Preparation Example 3 were stirred at 100° C. for 10 hours within a glove box having its inside air replaced by nitrogen. After the completion of the reaction, the reaction mixture was dissolved in 5 ml of chloroform, and the solution was thereafter poured into 250 ml of hexane being stirred. The resulting polymer precipitate was collected by suction filtration and dried, affording poly(p-chlorostyrene) in a yield of 77%.

GPC analysis (with reference to the molecular weight of an authentic sample of polystyrene) revealed Mn 7300 and PD=1.07.

EXAMPLE 20

Preparation of poly(methyl vinyl ketone)

A 25.8 mg quantity (0.10 mmole) of the ethyl-2-methyl-2-methyltellanyl-propionate prepared in Preparation Example 2, 0.70 g (10 mmoles) of methyl vinyl ketone and a solution of 28.5 mg (0.10 mmole) of the dimethyl ditelluride prepared in Preparation Example 3 were stirred at 80° C. for 48 hours within a glove box having its inside air replaced by nitrogen. After the completion of the reaction, the reaction mixture was dissolved in 5 ml of chloroform, and the solution was thereafter poured into 250 ml of hexane being stirred. The resulting polymer precipitate was collected by suction filtration and dried, affording poly(methyl vinyl ketone) in a yield of 21%.

GPC analysis [with reference to the molecular weight of an authentic sample of poly(methyl methacrylate)] revealed Mn 7800 and PD=1.25.

EXAMPLE 21

Preparation of poly(methacrylonitrile)

A solution of 25.8 mg quantity (0.10 mmole) of the ethyl-2-methyl-2-methyltellanyl-propionate prepared in Preparation Example 2, 671 mg (10 mmoles) of methacrylonitrile, 28.5 mg (0.10 mmole) of the dimethyl ditelluride prepared in Preparation Example 3 and 0.5 ml of dimethylformamide (DMF) were stirred at 80° C. for 48 hours within a glove box having its inside air replaced by nitrogen. After the completion of the reaction, the reaction mixture was dissolved in 5 ml of chloroform, and the solution was thereafter poured into 250 ml of hexane being stirred. The resulting polymer precipitate was collected by suction filtration and dried, affording poly(methacrylonitrile) in a yield of 48%.

GPC analysis [with reference to the molecular weight of an authentic sample of poly(methyl methacrylate)] revealed Mn 5900 and PD=1.09.

EXAMPLE 22

Preparation of poly(N-methyl methacrylamide)

A solution of 25.8 mg quantity (0.10 mmole) of the ethyl-2-methyl-2-methyltellanyl-propionate prepared in Preparation Example 2, 0.99 g (10 mmoles) of N-methyl methacrylamide, 28.5 mg (0.10 mmole) of the dimethyl ditelluride prepared in Preparation Example 3 and 0.5 ml of dimethylformamide (DMF) were stirred at 80° C. for 48 hours within a glove box having its inside air replaced by nitrogen. After the completion of the reaction, the reaction mixture was dissolved in 5 ml of chloroform, and the solution was thereafter poured into 250 ml of hexane being stirred. The resulting polymer precipitate was collected by suction filtration and dried, affording poly(N-methyl methacrylamide) in a yield of 78%.

GPC analysis [with reference to the molecular weight of an authentic sample of poly(methyl methacrylate)] revealed Mn 9300 and PD=1.18.

EXAMPLES 23 TO 25

Preparation of poly(methyl methacrylate)

Methyl methacrylate [stabilized with hydroquinone (HQ)] and a solution of the dimethyl ditelluride prepared in Preparation Example 3 were stirred in the ratio listed in Table 2 along with 25.8 mg (0.10 mmole) of the ethyl-2-methyl-2-methyltellanyl-propionate prepared in Preparation Example 2 in a glove box having its inside air replaced by nitrogen. After the completion of the reaction, a portion of the reaction mixture was dissolved in 5 ml of chloroform, and the solution was thereafter poured into 250 ml of hexane being stirred. The resulting polymer precipitate was collected by suction filtration and dried, affording poly(methyl methacrylate).

Table 2 shows the result of GPC analysis [with reference to the molecular weight of an authentic sample of poly(methyl methacrylate)].

TABLE 2

| Ex. | methyl methacrylate | dimethyl ditelluride | reaction condition | yield (%) | Mn | PD |
|---|---|---|---|---|---|---|
| 23 | 10.1 g (100 mmol) | 57.0 mg (0.2 mmol) | 80° C., 10 h | 57.8 | 47000 | 1.19 |
| 24 | 50.5 g (500 mmol) | 142.5 mg (0.5 mmol) | 80° C., 10 h | 86.0 | 278000 | 1.44 |
| 25 | 87.9 g (870 mmol) | 285 mg (1.0 mmol) | 80° C., 36 h | 70.0 | 514000 | 1.48 |

EXAMPLE 26

Random Copolymer of Styrene and Methyl Methacrylate

A 45.27 mg quantity (0.15 mmole) of the ethyl-2-methyl-2-n-butyltellanyl-propionate prepared in Preparation Example 10, 1.04 g (10 mmoles) of styrene, 0.5 g (5 mmoles) of methyl methacrylate and a solution of 55.5 mg (0.15 mmole) of the di-n-butyl ditelluride prepared in Preparation Example 11 were stirred at 80° C. for 30 hours within a glove box having its inside air replaced by nitrogen. After the completion of the reaction, the reaction mixture was dissolved in 5 ml of chloroform, and the solution was thereafter poured into 250 ml of hexane being stirred. The resulting polymer precipitate was collected by suction filtration and dried, affording a random copolymer of styrene and methyl methacrylate in a yield of 88%.

GPC analysis (with reference to the molecular weight of an authentic sample of polystyrene) revealed Mn 9900 and PD=1.19.

EXAMPLE 27

Random Copolymer of Styrene and Methyl Methacrylate

A 45.27 mg quantity (0.15 mmole) of the ethyl-2-methyl-2-n-butyltellanyl-propionate prepared in Preparation Example 10, 0.78 g (7.5 mmoles) of styrene, 0.76 g (7.5 mmoles) of methyl methacrylate and a solution of 55.5 mg (0.15 mmole) of the di-n-butyl ditelluride prepared in Preparation Example 11 were stirred at 80° C. for 30 hours within a glove box having its inside air replaced by nitrogen. After the completion of the reaction, the reaction mixture was dissolved in 5 ml of chloroform, and the solution was thereafter poured into 250 ml of hexane being stirred. The resulting polymer precipitate was collected by suction filtration and dried, affording a random copolymer of styrene and methyl methacrylate in a yield of 92%.

GPC analysis (with reference to the molecular weight of an authentic sample of polystyrene) revealed Mn 10500 and PD=1.23.

EXAMPLE 28

Random Copolymer of Styrene and Methyl Methacrylate

A 45.27 mg quantity (0.15 mmole) of the ethyl-2-methyl-2-n-butyltellanyl-propionate prepared in Preparation Example 10, 0.52 g (5 mmoles) of styrene, 1.01 g (10 mmoles) of methyl methacrylate and a solution of 55.5 mg (0.15 mmole) of the di-n-butyl ditelluride prepared in Preparation Example 11 were stirred at 80° C. for 30 hours within a glove box having its inside air replaced by nitrogen. After the completion of the reaction, the reaction mixture was dissolved in 5 ml of chloroform, and the solution was thereafter poured into 250 ml of hexane being stirred. The resulting polymer precipitate was collected by suction filtration and dried, affording a random copolymer of styrene and methyl methacrylate in a yield of 85%.

GPC analysis (with reference to the molecular weight of an authentic sample of polystyrene) revealed Mn 16000 and PD=1.23.

EXPERIMENTAL EXAMPLE 1

Elemental Analysis of C, H, N

The random copolymers of styrene and methyl methacrylate obtained in Examples 26, 27 and 28 were subjected to elemental analysis using an elemental analyzer (CHN Coder MT-3, product of Yanagimoto Seisakusho Co., Ltd.). Table 3 shows the results.

TABLE 3

| Ex. | material monomer ratio (mole %) | monomer ratio in resulting polymer (mole %) |
|---|---|---|
| 26 | St:MMA = 66.6:33.3 | St:MMA = 61.3:38.7 |
| 27 | St:MMA = 50.0:50.0 | St:MMA = 50.6:49.4 |
| 28 | St:MMA = 33.3:66.6 | St:MMA = 32.4:67.6 |

Table 3 reveals that the process of the invention for preparing living radical polymers provides random copolymers each having substantially the same original material ratio (mole ratio).

EXAMPLE 29

Preparation of poly(methyl methacrylate-b-styrene) diblock polymer

A 1.01 g quantity (10 mmoles) of methyl methacrylate, 24.8 mg (0.10 mmole) of the (1-methyltellanyl-ethyl)benzene prepared in Preparation Example 1 and 28.5 mg (0.10 mmole) of the dimethyl ditelluride prepared in Preparation Example 3 were reacted at 80° C. for 15 hours in a glove box having its inside air replaced by nitrogen. After the completion of the reaction, the reaction mixture was dissolved in 5 ml of deuterochloroform, and the solution was thereafter poured into 300 ml of hexane being stirred. The resulting polymer precipitate was collected by suction filtration and dried, affording 0.809 g (yield 91%) of poly(methyl methacrylate). GPC analysis revealed Mn 8500 and PD=1.12.

Next, 425 mg (0.05 mmole) of the poly(methyl methacrylate) (used as a macroinitiator) obtained above and 520 mg (5 mmoles) of styrene were reacted at 100° C. for 24 hours. After the completion of the reaction, the reaction mixture was dissolved in 5 ml of chloroform, and the solution was thereafter poured into 300 ml of hexane being stirred. The resulting polymer precipitate was collected by suction filtration and dried, affording 0.7983 g (yield 85%) of poly(methyl methacrylate-b-styrene) diblock polymer. GPC analysis revealed Mn 19000 and PD=1.13.

EXAMPLE 30

Preparation of poly(styrene-b-methyl methacrylate) diblock polymer

A 1.04 g quantity (10 mmoles) of styrene and 24.8 mg (0.10 mmole) of the (1-methyltellanyl-ethyl)benzene prepared in Preparation Example 1 were reacted at 100° C. for 20 hours in a glove box having its inside air replaced by nitrogen. After the completion of the reaction, the reaction mixture was dissolved in 5 ml of deuterochloroform, and the solution was thereafter poured into 300 ml of hexane being stirred. The resulting polymer precipitate was collected by suction filtration and dried, affording a polystyrene in a yield of 95%. GPC analysis revealed Mn 9000 and PD=1.15.

Next, 0.05 mmole of the polystyrene (used as a macroinitiator) obtained above, 0.505 g (5 mmoles) of methyl methacrylate and 28.5 mg (0.10 mmole) of the dimethyl ditelluride prepared in Preparation Example 3 were reacted at 80° C. for 16 hours. After the completion of the reaction, the reaction mixture was dissolved in 5 ml of chloroform, and the solution was thereafter poured into 300 ml of hexane being stirred. The resulting polymer precipitate was collected by suction filtration and dried, affording a poly(styrene-b-methyl methacrylate) diblock polymer in a yield of 85%. GPC analysis revealed Mn 13900 and PD=1.25.

EXAMPLE 31

Preparation of poly(methyl methacrylate-b-tert-butyl acrylate) diblock polymer

A 1.01 g quantity (10 mmoles) of methyl methacrylate, 24.8 mg (0.10 mmole) of the (1-methyltellanyl-ethyl)benzene prepared in Preparation Example 1 and 28.5 mg (0.10 mmole) of the dimethyl ditelluride prepared in Preparation Example 3 were reacted at 80° C. for 15 hours in a glove box having its inside air replaced by nitrogen. After the completion of the reaction, the reaction mixture was dissolved in 5 ml of deuterochloroform, and the solution was thereafter poured into 300 ml of hexane being stirred. The resulting polymer precipitate was collected by suction filtration and dried, affording 0.809 g (yield 91%) of poly(methyl methacrylate). GPC analysis revealed Mn 8500 and PD=1.12.

Next, 425 mg (0.05 mmole) of the poly(methyl methacrylate) (used as a macroinitiator) obtained above and 641 mg (5 mmoles) of t-butyl acrylate were reacted at 100° C. for 35 hours. After the completion of the reaction, the reaction mixture was dissolved in 5 ml of chloroform, and the solution was thereafter poured into 300 ml of hexane being stirred. The resulting polymer precipitate was collected by suction filtration and dried, affording a poly(methyl methacrylate-b-tert-butyl acrylate) diblock polymer in a yield of 57%. GPC analysis revealed Mn 17300 and PD=1.11.

EXAMPLE 32

Preparation of poly(tert-butyl acrylate-b-methyl methacrylate) diblock polymer

A 1.28 g quantity (10 mmoles) of t-butyl acrylate and 24.8 mg (0.10 mmole) of the (1-methyltellanyl-ethyl)benzene prepared in Preparation Example 1 were reacted at 100° C. for 24 hours in a glove box having its inside air replaced by nitrogen. After the completion of the reaction, the reaction mixture was dissolved in 5 ml of deuterochloroform, and the solution was thereafter poured into 300 ml of hexane being stirred. The resulting polymer precipitate was collected by suction filtration and dried, affording a poly(t-butyl acrylate) in a yield of 85%. GPC analysis revealed Mn 7600 and PD=1.15.

Next, 0.05 mmole of the poly(t-butyl acrylate) (used as a macroinitiator) obtained above and 0.505 g (5 mmoles) of methyl methacrylate, 28.5 mg (0.10 mmole) of the dimethyl ditelluride prepared in Preparation Example 3 and 2 ml of trifluoromethylbenzene were reacted at 100° C. for 18 hours. After the completion of the reaction, the reaction mixture was dissolved in 5 ml of chloroform, and the solution was thereafter poured into 300 ml of hexane being stirred. The resulting polymer precipitate was collected by suction filtration and dried, affording poly(tert-butyl acrylate-b-methyl methacrylate) diblock polymer in a yield of 88%. GPC analysis revealed Mn 19500 and PD=1.35.

EXAMPLE 33

Preparation of poly(methyl methacrylate-b-tert-butyl acrylate-b-methyl methacrylate) triblock polymer A 1.01 g quantity (10 mmoles) of methyl methacrylate, 24.8 mg (0.10 mmole) of the (1-methyltellanyl-ethyl)benzene prepared in Preparation Example 1 and 28.5 mg (0.10 mmole) of the dimethyl ditelluride prepared in Preparation Example 3 were reacted at 80° C. for 15 hours in a glove box having its inside air replaced by nitrogen. Subsequently, 1.28 g (10 mmoles) of tert-butyl acrylate was added to the reaction mixture and reacted therewith at 100° C. for 35 hours (Mn 11500, PD=1.09). Then added to the reaction mixture were 2.39 g (23 mmoles) of styrene and 5 ml of trifluoromethylbenzene, and the mixture was reacted at 100° C. for 15 hours. After the completion of the reaction, the reaction mixture was dissolved in 5 ml of chloroform, and the solution was thereafter poured into 300 ml of hexane being stirred. The resulting polymer precipitate was collected by suction filtration and dried, affording poly(methyl methacrylate-b-tert-butyl acrylate-b-methyl methacrylate) triblock polymer in a yield of 69%. GPC analysis revealed Mn 21600 and PD=1.27.

EXAMPLE 34

Preparation of poly(methyl methacrylate-b-styrene-b-tert-butyl acrylate) triblock polymer A 1.01 g quantity (10 mmoles) of methyl methacrylate, 24.8 mg (0.10 mmole) of the (1-methyltellanyl-ethyl)benzene prepared in Preparation Example 1 and 28.5 mg (0.10 mmole) of the dimethyl ditelluride prepared in Preparation Example 3 were reacted at 80° C. for 15 hours in a glove box having its inside air replaced by nitrogen. Subsequently, 1.04 g (10 mmoles) of styrene was added to the reaction mixture and reacted therewith at 100° C. for 24 hours (Mn 18700, PD=1.18). Then added to the reaction mixture were 3.85 g (30 mmoles) of tert-butyl acrylate and 3 ml of trifluoromethylbenzene, and the mixture was reacted at 100° C. for 24 hours. After the completion of the reaction, the reaction mixture was dissolved in 5 ml of chloroform, and the solution was thereafter poured into 300 ml of hexane being stirred. The resulting polymer precipitate was collected by suction filtration and dried, affording a poly(methyl methacrylate-b-styrene-b-tert-butyl acrylate) triblock polymer in a yield of 45%. GPC analysis revealed Mn 21900 and PD=1.18.

EXAMPLE 35

Preparation of poly(styrene-b-methyl methacrylate-b-tert-butyl acrylate) triblock polymer A 1.04 g quantity (10 mmoles) of styrene, 24.8 mg (0.10 mmole) of the (1-methyltellanyl-ethyl)benzene prepared in Preparation Example 1 were reacted at 100° C. for 20 hours in a glove box having its inside air replaced by nitrogen. Subsequently, 1.01 g (10 mmoless) of methyl methacrylate and 28.5 mg (0.10 mmole) of the dimethyl ditelluride prepared in Preparation Example 3 were added to the reaction mixture and reacted therewith at 80° C. for 16 hours (Mn 12700, PD=1.30). Then added to the reaction mixture were 3.85 g (30 mmoles) of tert-butyl acrylate and 3 ml of trifluoromethylbenzene, and the mixture was reacted at 100° C. for 24 hours. After the completion of the reaction, the reaction mixture was dissolved in 5 ml of chloroform, and the solution was thereafter poured into 300 ml of hexane being stirred. The resulting polymer precipitate was collected by suction filtration and dried, affording a poly(styrene-b-methyl methacrylate-b-tert-butyl acrylate) triblock polymer in a yield of 32%. GPC analysis revealed Mn 16110 and PD=1.27.

INDUSTRIAL APPLICABILITY

The invention provides a process for preparing living radical polymers which realizes precision control of molecular weights and molecular weight distributions under mild conditions. The living radical polymers obtained by the polymerization process of the invention readily permit conversion of terminal groups to other functional groups, are useful for preparing macromonomers and useful as crosslinking sites and are usable as compatibilizing agents and as materials for block polymers.

The invention claimed is:

1. A mixture of a living radical polymerization initiator represented by the formula (1) and a compound represented by the formula (2)

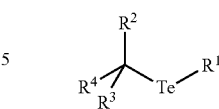

(1)

wherein $R^1$ is $C_1$-$C_8$ alkyl, aryl, substituted aryl or an aromatic heterocyclic group, $R^2$ and $R^3$ are each a hydrogen atom or $C_1$-$C_8$ alkyl, and $R^4$ is aryl, substituted aryl, an aromatic heterocyclic group, acyl, oxycarbonyl or cyano $$(R^1Te)_2 \qquad (2)$$

wherein $R^1$ is the same as above.

2. A mixture according to claim 1 wherein the living radical polymerization initiator represented by the formula (1) is an organotellurium compound represented by the formula (1) wherein $R^1$ is $C_1$-$C_4$ alkyl, $R^2$ and $R^3$ are each a hydrogen atom or $C_1$-$C_4$ alkyl, and $R^4$ is aryl, substituted aryl or oxycarbonyl, and the compound represented by the formula (2) is a compound wherein $R^1$ is $C_1$-$C_4$ alkyl or phenyl.

3. A process for producing a diblock copolymer wherein a compound of the formula (1) and a compound of the formula (2) are used when a homopolymer is prepared from the first of monomers and/or when the diblock copolymer is subsequently prepared

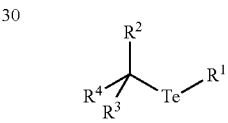

(1)

wherein $R^1$ is $C_1$-$C_8$ alkyl, aryl, substituted aryl or an aromatic heterocyclic group, $R^2$ and $R^3$ are each a hydrogen atom or $C_1$-$C_8$ alkyl, and $R^4$ is aryl, substituted aryl, an aromatic heterocyclic group, acyl, oxycarbonyl or cyano $$(R^1Te)_2 \qquad (2)$$

wherein $R^1$ is the same as above.

4. A process for producing a triblock copolymer wherein a compound of the formula (1) and a compound of the formula (2) are used at least once when a homopolymer is prepared from the first of monomers, or when a diblock copolymer is subsequently prepared, or when the triblock copolymer is subsequently prepared

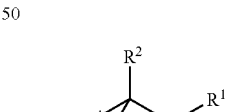

(1)

wherein $R^1$ is $C_1$-$C_8$ alkyl, aryl, substituted aryl or an aromatic heterocyclic group, $R^2$ and $R^3$ are each a hydrogen atom or $C_1$-$C_8$ alkyl, and $R^4$ is aryl, substituted aryl, an aromatic heterocyclic group, acyl, oxycarbonyl or cyano $$(R^1Te)_2 \qquad (2)$$

wherein $R^1$ is the same as above.

5. A process for producing a diblock copolymer comprising mixing together an (meth)acrylic acid ester monomer, a living radical polymerization initiator represented by the formula (1) and a compound of the formula (2) to prepare a poly(meth)acrylate, and subsequently mixing an aromatic unsaturated monomer with the product to obtain an (meth)acrylate-aromatic unsaturated monomer diblock copolymer

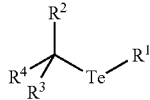 (1)

wherein $R^1$ is $C_1$-$C_8$ alkyl, aryl, substituted aryl or an aromatic heterocyclic group, $R^2$ and $R^3$ are each a hydrogen atom or $C_1$-$C_8$ alkyl, and $R^4$ is aryl, substituted aryl, an aromatic heterocyclic group, acyl, oxycarbonyl or cyano $(R^1Te)_2$ (2)

wherein $R^1$ is the same as above.

6. process for producing a triblock copolymer comprising mixing together an (meth)acrylic acid ester monomer, a living radical polymerization initiator represented by the formula (1) and a compound of the formula (2) to prepare a poly(meth)acrylate, subsequently mixing an aromatic unsaturated monomer with the product to obtain an (meth)acrylate-aromatic unsaturated monomer block copolymers, and subsequently mixing an (meth)acrylic acid ester monomer or aromatic unsaturated monomer with the copolymer to obtain the triblock copolymer

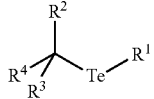 (1)

wherein $R^1$ is $C_1$-$C_8$ alkyl, aryl, substituted aryl or an aromatic heterocyclic group, $R^2$ and $R^3$ are each a hydrogen atom or $C_1$-$C_8$ alkyl, and $R^4$ is aryl, substituted aryl, an aromatic heterocyclic group, acyl, oxycarbonyl or cyano $(R^1Te)_2$ (2)

wherein $R^1$ is the same as above.

* * * * *